US012657304B2

(12) United States Patent
Patino et al.

(10) Patent No.: US 12,657,304 B2
(45) Date of Patent: Jun. 16, 2026

(54) UPDATE OF AN OPERATING SYSTEM IN A SECURITY ELEMENT

(71) Applicant: GIESECKE+DEVRIENT MOBILE SECURITY GERMANY GMBH, Munich (DE)

(72) Inventors: David Patino, Sant Vicenc dels Korts (ES); Clara Gifre, Barcelona (ES); Federico Ruau, Hospitalet de Llobregat (ES); Ruben Gomez Jimenez, Palau-solità 1 Plegamans (ES)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 225 days.

(21) Appl. No.: 18/291,689

(22) PCT Filed: Jul. 26, 2022

(86) PCT No.: PCT/EP2022/025347
§ 371 (c)(1),
(2) Date: Jan. 24, 2024

(87) PCT Pub. No.: WO2023/006244
PCT Pub. Date: Feb. 2, 2023

(65) Prior Publication Data
US 2024/0256671 A1 Aug. 1, 2024

(30) Foreign Application Priority Data
Jul. 28, 2021 (EP) ..................................... 21382705

(51) Int. Cl.
G06F 9/44 (2018.01)
G06F 8/61 (2018.01)
(Continued)

(52) U.S. Cl.
CPC .............. G06F 21/572 (2013.01); G06F 8/63 (2013.01); G06F 21/602 (2013.01)

(58) Field of Classification Search
CPC ......... G06F 8/63; G06F 21/572; G06F 21/602
See application file for complete search history.

(56) References Cited

U.S. PATENT DOCUMENTS 10,069,633 B2 * 9/2018 Gulati .................... G06F 21/572
10,936,719 B2 3/2021 Sibert et al.
(Continued)

OTHER PUBLICATIONS

Extended European Search Report from corresponding European Patent Application No. EP21382705.8, Nov. 19, 2021.
(Continued)

*Primary Examiner* — Qamrun Nahar
(74) *Attorney, Agent, or Firm* — Workman Nydegger

(57) ABSTRACT

A method is for updating an operating system, OS, administering a file system in a secure element, SE. The method includes the steps of providing an update agent in the SE; assuming control of the SE by the update agent from the operating system; loading an OS image into the SE, the OS image representing an update of the operating system; providing an updated operating system by installing the OS image; and handing over control of the SE by the update agent to the updated operating system. Within this update process, the update agent provides a provisional file system in the SE and administers the provisional file system as long as the update agent is in control of the SE. A respective secure element, a respective update agent, and to a respective computer-program product employ the method.

14 Claims, 4 Drawing Sheets

(51) Int. Cl.
    G06F 21/57         (2013.01)
    G06F 21/60         (2013.01)

(56)                     References Cited

U.S. PATENT DOCUMENTS

| 2006/0200658 A1* | 9/2006 | Penkethman | G06F 8/65 |
| | | | 713/2 |
| 2018/0089434 A1* | 3/2018 | Sibert | G06F 21/57 |
| 2021/0312054 A1* | 10/2021 | Kloth | G06F 21/57 |

OTHER PUBLICATIONS

International Search Report from corresponding PCT Application No. PCT/EP2022/025347, Oct. 18, 2022.

* cited by examiner

1

UPDATE OF AN OPERATING SYSTEM IN A SECURITY ELEMENT

The present invention relates to secure elements in general, and in particular to a method for updating an operating system of a secure element, a secure element fitted with an update agent with update capabilities, as well as an according update agent and a computer-program product.

BACKGROUND OF THE INVENTION

Smart cards are widely used in a variety of systems such as mobile phones, payment cards, access cards, to provide identification, authentication, and data storage services as well as application processing.

Where the smart card contains security-critical applications and sensitive data, such as in the case of payment cards and the like, a secure element is used to store the data. A secure element is a tamper resistant element, TRE, that provides a secure memory and execution environment in which application code and application data can be securely stored and administered. The secure element ensures that access to the data stored on the card is provided only when authorized. Such a secure element may exist in any form factor such as UICC, embedded SE, smartSD, smart microSD, etc.

A secure element may include one or more security domains, each of which including a collection of data, such as operating system, personalization data, packages, applets, applications, and the like, which are authenticated using security keys. Thus, the operating system and applications are stored within the secure element in volatile and nonvolatile memory modules, and are executed by a secured processor of the secure element.

A secure element may further comprise a file system according to ISO/IEC 7816-4 in the form of a hierarchical file structure consisting of a master file and a number of dedicated files (DF) and elementary files (EF) as directories and data files, respectively. An application executed on the secure element or an external terminal connected to the secure element may select an EF and perform read/write operations on the EF's data. The communication interfaces of a secure element as well as its interaction with an external terminal is specified in the standard ETSI TS 102 221 (Smart Cards; UICC-Terminal interface; Physical and logical characteristics), e.g. in version v15.2.0.

Further, the specification Global Platform Card Technology Open Firmware Loader for Tamper Resistant Element v1.3 describes a standardized mechanism for loading firmware (use case dependent data which may contain the operating system and application data) into a secure element. In particular, an Image Trusted Loader, ITL, or update agent, provided inside the secure element is configured to receive an operating system image, to perform authenticity and integrity checks on the image, and to trigger installation of the image into a memory of the secure element.

Throughout this process of receiving, checking and installing an operating system, the ITL or update agent is in control of the secure element and particularly is in charge of its communication with an external entity or terminal the secure element may be connected with, for example via incoming and outgoing APDU messages according to ISO/IEC 7816-4. Likewise, in the course of an operating system update, there is a period in which the update agent is in charge of the secure element, because the operating system is neither operable nor has the update process been completed.

FIG. 1 shows a schematic representation of the conventional process of loading firmware (e.g., an operating system, OS) into a secure element. The upper row shows the entities responsible for the corresponding production phase (I, II, III, IV), while the lower row shows the content of the secure element (i.e., chip) in the particular production phase. During a first production phase I at a chip production site (i.e., the chip factory), the chip manufacturer provides for a secure element 100 to be loaded with trusted software, such as a secure operating system. The initial secure OS 30 is personalized with credentials 13 and the personalized secure OS image (in FIG. 1 identified by "maxiInit") is loaded together with the update agent inside the chip. The chip with its OS can then be embedded in a portable device (phase II) or delivered to another device manufacturer to be included in a bigger electronic device like a smart phone, a computer, a car, a measurement equipment, etc. (phase III), and finally released to the market (phase IV).

Complementary to this conventional approach it may be required to change or update an OS loaded on the chip until and even after the embedded chip is delivered to the market, because trusted software, such as an operating system, may be loaded anywhere via the update agent of the SE. In a scenario, however, in which an OS image is loaded onto the SE and installed as an updated OS, commands or requests by an external terminal connected to the secure element may not be responded to properly, because the regular file system and related data are not available during an operating system update.

The inability of the update agent to process such external requests may result in a deactivation of the secure element by the terminal as it does not receive a meaningful response from the SE during OS update. For security reasons, this may even render the SE completely unusable.

Accordingly, there remains a need to provide a solution for updating an operating system of a secure element which addresses the above-mentioned drawbacks.

SUMMARY OF THE INVENTION

According to a first aspect of the present invention, there is suggested a method for updating an operating system, OS, administering a file system in a secure element, SE. The method comprises in a first step providing an update agent in the SE. In a further step, the update agent assumes control of the SE from the operating system. Further, an OS image is loaded into the SE that represents an update of the currently installed operating system. By installing the OS image an updated operating system is provided on the SE. In a final step, the update agent hands over control of the SE to the updated operating system. In order to overcome the above-addressed drawbacks, the update agent provides a provisional file system in the SE and administers the provisional file system as long as the update agent is in charge of the SE, that is, during the period between assuming control from the OS and handing over control back to the updated OS.

Throughout this application the term "operating system" shall cover any trusted system-critical software or part thereof, required for operating a security element and to be loaded and executed in the secure element. Examples of such trusted software include firmware, an operating system, and any other use-case dependent secure applications required for operating the SE. The expression "OS image" refers to a generic data format encapsulating a software version and cryptographic data to be used by the operating system or an agent of the SE, such as the update agent according to the present invention.

The proposed method provides an efficient and secure solution for updating a trusted software without interrupting an interaction of an external terminal with the secure element while its operating system is updated and, as a consequence, without the SE being deactivated or disconnected.

Because the provisional file system is administered as long as the update agent is in control of the SE and its communication with an external terminal, it replaces the temporarily unavailable regular file system and enables the update agent to process commands or requests from the external terminal in a meaningful way. In other words, the provisional file system simulates, or one may even conclude 'mocks', the regular file system to an extent that a connected terminal receives meaningful responses in reply to its commands and requests. Consequently, because an interaction between SE and terminal is not interrupted, the secure element needs not to be deactivated or disconnected by the external terminal In some embodiments, the provisional file system provided by the update agent may contain only the minimum functionality and/or minimum data to allow for processing commands from an external terminal. Because of the minimum functionality and/or data of the provisional file system, the memory space required is minimized as well, so that the provisional file system fits within the limited memory space available to the update agent during the update process.

In some embodiments, the provisional file system may be sufficiently structured and/or equipped with sufficient data so that it is transparent to an external terminal that instead of the regular file system only the provisional file system is available. Preferably, it is particularly transparent to the external terminal that it is not the operating system of the SE, which is administering the available file system, but instead the update agent. By this, deactivation or disconnection of the SE by the external terminal can be reliably prevented.

The present invention provides the advantage that the provision file system requires much less memory space that the regular file system but nevertheless is sufficiently configured to allow for meaningful responses to commands or requests from an external terminal that addresses the SE during an OS update when the update agent is in charge of the SE and its communication and interfaces.

In fact, on a broader scale, another advantage of the present invention is that the SE, equipped with the update agent according to the invention, supports handling intermediate non-functional states of the operating system or another trusted, system-relevant software required for operating the secure element. For example, the present invention ensures, upon transitions of the system from one state to another, that an external entity or terminal engages or continues to engage with the SE in a transitional situation by offering a proper, well-defined behavior.

The update agent is loaded into the SE in the initial production phase at the chip factory, i.e. within the secure environment of the chip manufacturing site (in FIG. 1 referred to as phase I). Preferably, personalization data, including secure credentials, is loaded together with the update agent into the secure element, thus ensuring strict safety conditions and protection from un-authorized modification of confidential data. The initial operating system may be loaded, personalized and installed on the SE in the initial production phase or in a subsequent phase, if security measures apply that ensure tamper-protection. The initial operating system, however, may be required to be updated at a later phase of the life cycle of the SE, for example in a phase subsequent to the initial production phase (in FIG. 1 referred to as phases II, III, IV).

Preferably, the provisional file system is provided within or as a part of the update agent, for example as a part of or comprised in the personalization data of the update agent. Therefore, since the provisional file system is realized as a part of the update agent, the latter provides the provisional file system so that it can be administered by the update agent and thereby temporarily replace the unavailable regular file system as long as the update agent is in control of the SE. In that case, the provisional file system is provided in the course of personalization of the update agent's cryptographic keys. Therefore, the provisional file system is provided within the secure environment during the production phase of the secure element.

The process of updating an installed operating system, which is conducted by the trusted update agent, may be repeated. Therefore, if required, an already updated operating system is updated again. In principle, the operating system image that, when installed, provides for an update of a presently installed operating system and/or respective personalization data may either be loaded during the initial production phase or may be loaded in a subsequent phase, provided such loading is conducted in a tamper-protected and trusted fashion.

Either way, at some point the update agent assumes control over the SE from the operating system to be updated so that, in effect, as of this point in time the operating system is not any more in charge of the SE and cannot control its processing and interaction. Particularly because the regular file system is not available as long as the SE is not under the control of a regular operating system, the update agent is configured to overcome the otherwise limited functionality of the SE in absence of the regular operating system by providing and administering the provisional file system. The update agent assumes control from the operating system when the operating system is deactivated in view of its update.

In essence, if the update agent is in charge, the provisional file system is administered and thus active. As soon as the update of the OS is completed, control switches over to the updated OS the regular file system is administered/active while the provisional file system is not active anymore.

Due to the availability of the provisional file system in the period when the current operating system is not present anymore and the updated operating system is not yet in control of the SE, the present invention provides an efficient and secure solution for updating an operating system in the field because the provisional file system ensures a minimum functionality and interoperability of the SE, thus preventing an external terminal from deactivating or disconnecting the SE. Therefore, while the update agent is loaded into the SE during the initial production phase of the SE in a chip factory, the OS image may be loaded into the SE and/or a loaded OS image may be installed on the SE in a subsequent phase of the secure element's life cycle, after the initial production phase of the SE, thus providing a flexible solution for updating an operating system at any time during the lifecycle of a secure element and preventing drawbacks of conventional update schemes.

In some embodiments, the provisional file system is structured as a specific data record, preferably as a data grouping identified by a data grouping identifier, DGI. The DGI determines how the data grouping is structured and how it can be accessed and processed. The data grouping representing the provisional file system and the respective DGI may be, preferably, a proprietary structure defined by the manufacturer of the SE and coded in the update agent. Upon provision of the provisional file system, the respective data grouping is created within the SE based on its specification as identified by the DGI. The data grouping is, according to its specified structure, stored in a memory of the SE, for example in its non-volatile memory. Preferably, the data grouping representing the provisional file system is stored in a specific memory structure of the update agent.

Preferably, the data grouping provides an internal structure representing a hierarchical smart card file system according to ISO/IEC 7816-4 comprising dedicated files, DF, and elementary files, EF. The DFs and EFs of the provisional file system represent a minimum selection of the DFs and EFs of the temporarily unavailable regular file system, while the hierarchical file structure of the provisional file system mirrors the structure and files of the regular file system that the provisional file system temporarily replaces or simulates.

Preferably, the data grouping and the hierarchical file structure provided is logically organized in a TLV format (tag, length, value) that reflects the hierarchical parent/child relationship of the respective files. That is, each file of the provisional file system is coded as a TLV item, having a binary code identifying the file type (tag), an indication of a byte size (length) and a data field of the specified size carrying the data of the respective file (value).

If, while the update agent is in control of the SE, an external terminal sends a command to the SE (for example by a command-APDU) that is directed to an elementary file, the EF is selected by providing a pointer to the tag of the TLV item representing the respective file. The pointer to the selected file is kept by the update agent so that commands of an external terminal directed to the selected file can be processed by the update agent and responded to (for example by a response-APDU).

If, while the update agent is in control of the SE, an external terminal sends a command to the SE that is not related to a specific file of the provisional file system, the update agent may respond a status code or status byte that signals that the command is processed while, in fact, the command is not processed by the update agent or the processing is postponed until the regular file system is available. The status code nevertheless signals vis-à-vis the external terminal that the SE is operative and does not need to be deactivated.

According to a second aspect of the present invention, there is provided a secure element comprising an operating system administering a file system and an update agent configured to conduct a method as specified above. Particularly, the update agent is configured to assume control of the SE from the operating system; to load an OS image into the SE that represents an update of the operating system; to install the OS image and, by that, provide an updated operating system; and to finally hand over control of the SE to the updated operating system. In order to prevent an external terminal from deactivating or disconnecting the secure element due to lack of or wrong responses to the terminal's requests, the update agent provides or is configured to provide a provisional file system in the SE and to administer the provisional file system during the period when the update agent is in control of the SE, i.e. until the updated operating system assumes control over the SE and provides for its regular functionality and interoperability.

According to a third aspect of the present invention, there is provided an update agent configured to conduct a method as specified above. The update agent is, preferably, realized as an executable software product configured to be installed on a security element as disclosed under the second aspect and to be executed by a processor of the security element in order to conduct a method as disclosed under the first aspect of the present invention.

According to yet another aspect of the present invention, there is provided a computer-program for use in conjunction with a secure element according to the second aspect in an electronic device in which the secure element is or can be embedded. The computer-program product comprises a non-transitory computer-readable storage medium and a computer-program mechanism embedded therein, to load a software into the secure element in the electronic device. The computer-program mechanism includes instructions for assuming control of the SE from the operating system; for loading an OS image into the SE that represents an update of the operating system; for providing an updated operating system by installing the OS image; for handing over control of the SE by the update agent to the updated operating system; and for providing a provisional file system in the SE and for administering the provisional file system as long as the update agent is in control of the SE.

It has to be noted that all the processes, devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which.

DETAILED DESCRIPTION

Figure 1:
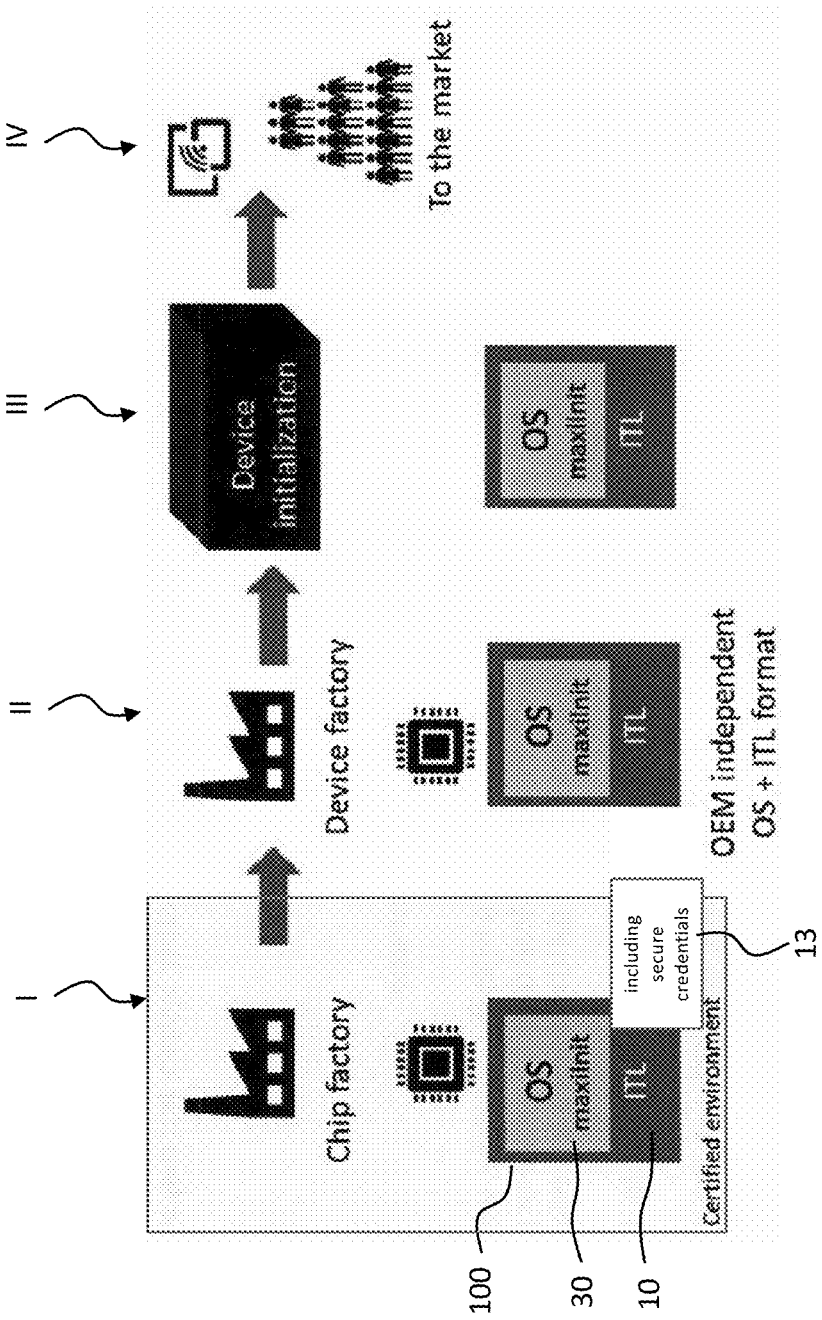
FIG. 1 shows a schematic representation of the conventional production flow of a secure element with an update agent.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
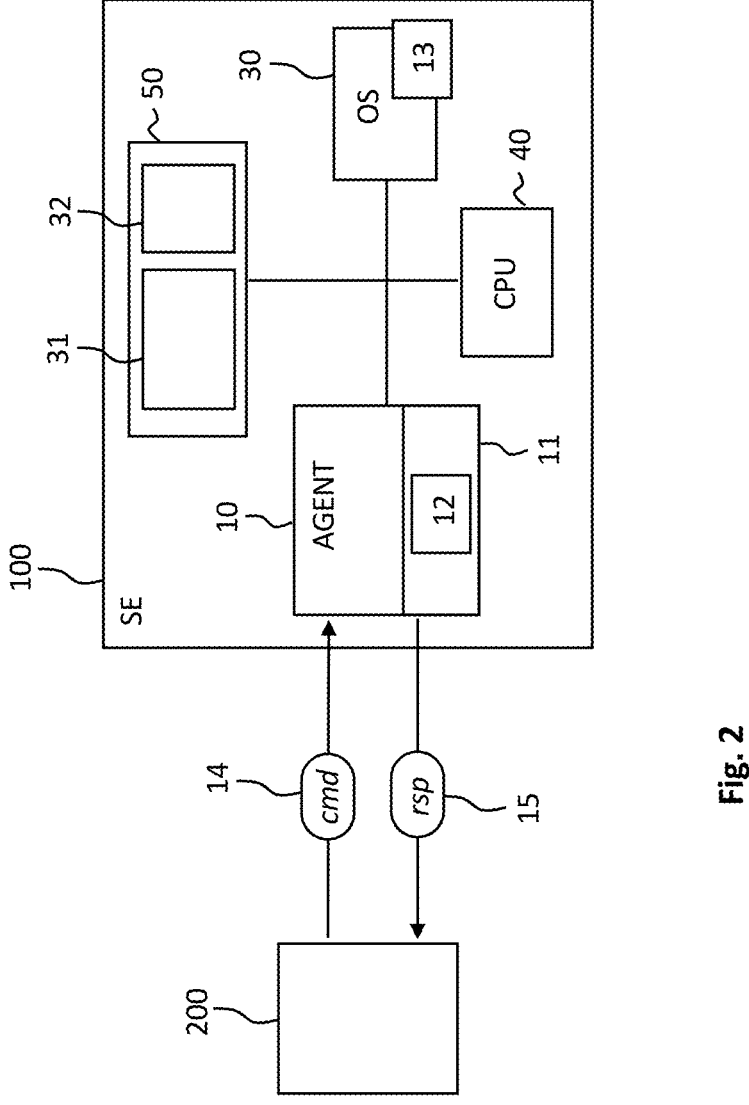
FIG. 2 shows the structure of a secure element according to a preferred embodiment of the present invention.
Figure 3:
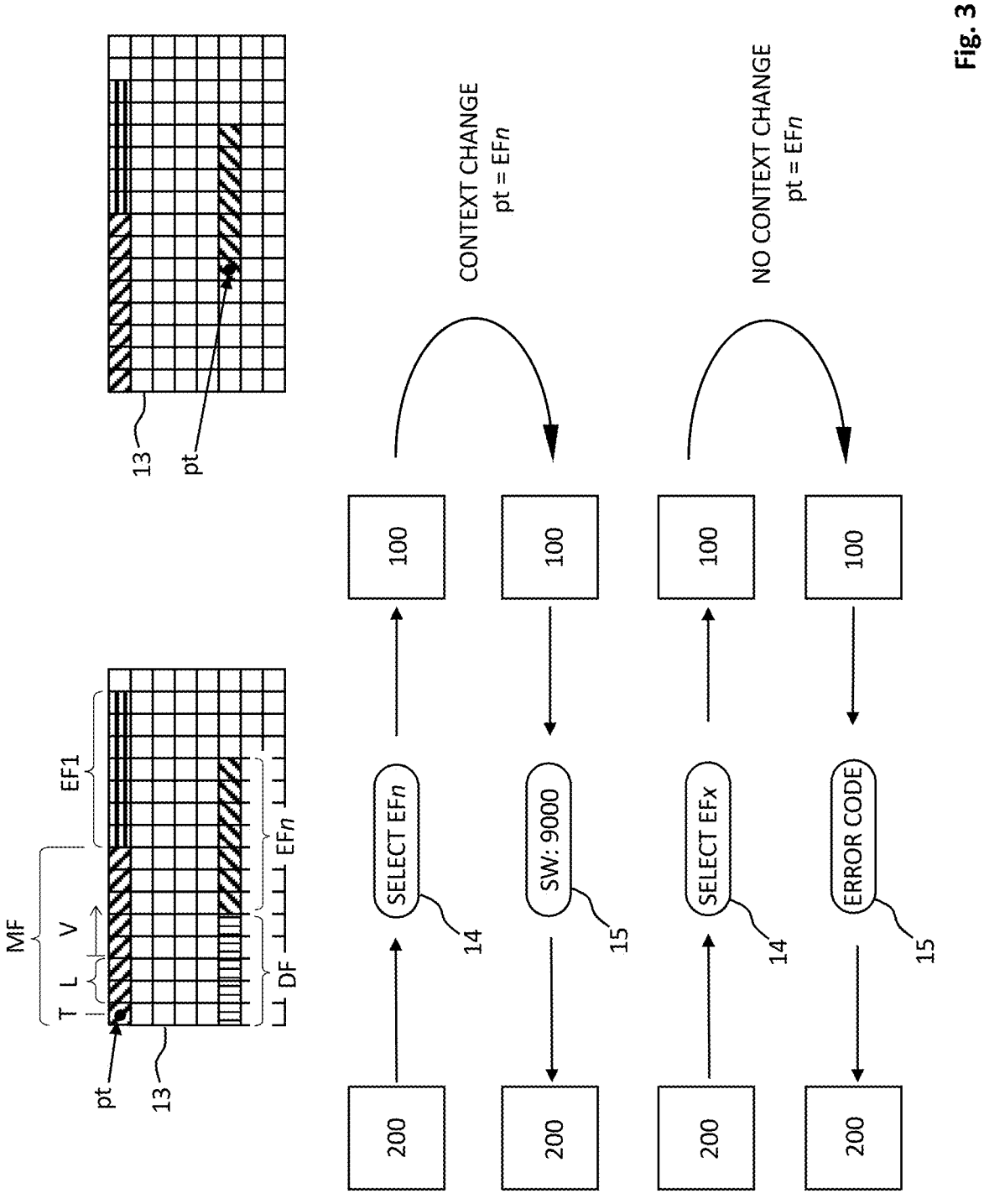
FIG. 3 illustrates a preferred structure of the provisional file system according to the present invention and a communication of a secure element with an external terminal.
Figure 4:
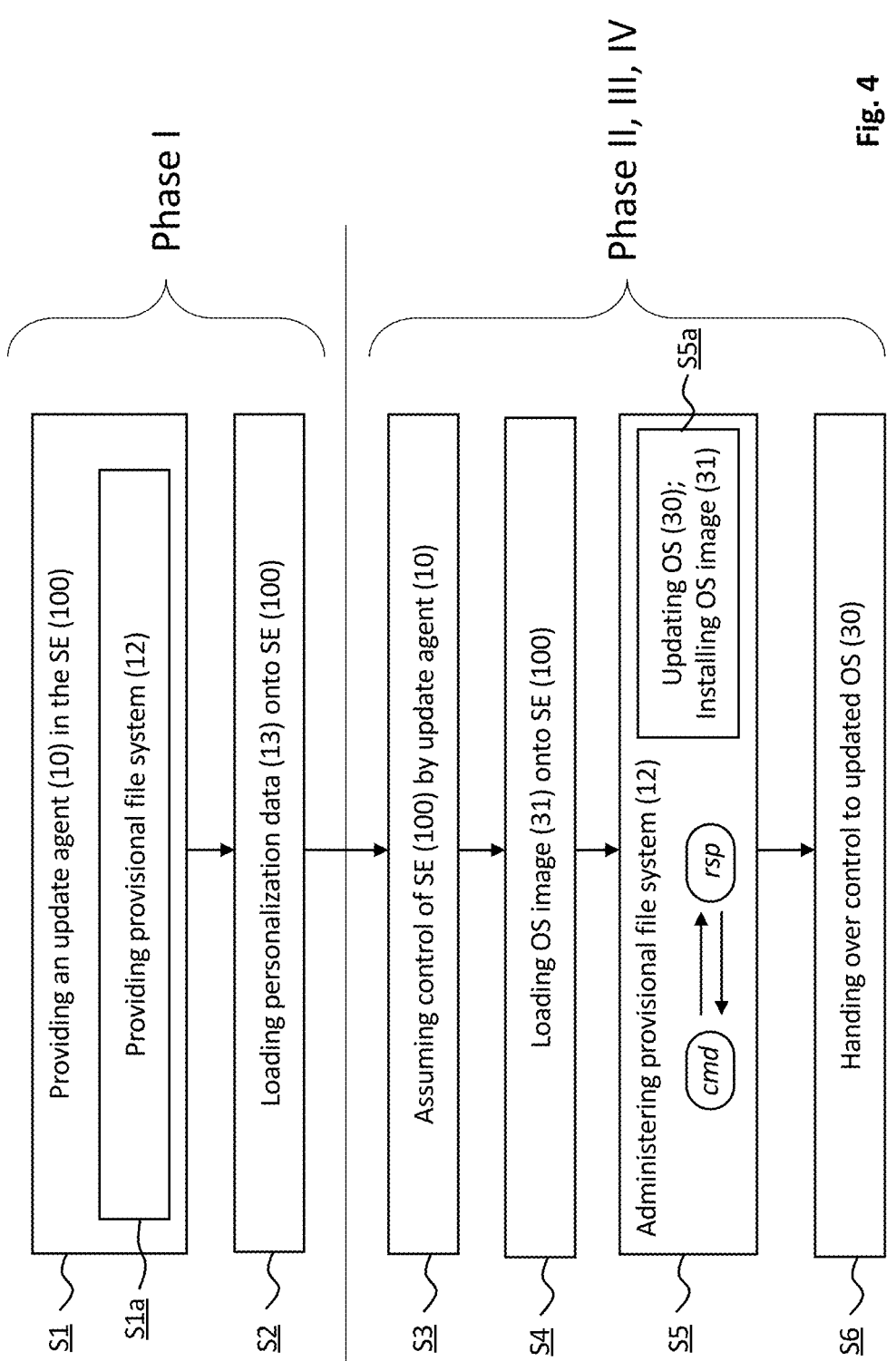
FIG. 4 shows a flow diagram illustrating a method according to the present invention.

FIG. 2 show the structure of the secure element, SE, 100 according a preferred embodiment in greater detail. A provisional file system 12 administered by an update agent 10 of the SE 100 as well as the interaction between the SE 100 and an external terminal 200 is shown in FIG. 3. Finally, FIG. 4 shows, in connection to FIGS. 2 and 3, the steps of a method according to the present invention.

The SE 100 shown in FIG. 2 is a tamper resistant element, TPE, containing an update agent 10, an operating system, OS, 30 and a processor, CPU, 40. Both the update agent 10 and the OS 30 may be stored in a memory of the SE 100, such as the non-volatile memory 50. The OS 30 and the update agent 10 are independent entities that can communicate with each other over an appropriate interface, for instance over an Application Programming Interface, API. Memory 50 is a memory of the SE 100 that stores software being uploaded installed on the SE 100 and executable by the CPU 40. Such installed software may be an executable application or program that provides a certain functionality to the SE 100, or may even be the OS 30 of the secure element 100. The OS 30 is a standard smart card operating system, for example based on the Java Card platform. The OS 30, being personalized by personalization data 13, is identified in FIG. 1 as "maxInit". Like any other software installed on the SE 100, the OS 30 may also be required to be updated at a certain point of the life cycle of the SE 100.

The update agent 10 may be a functional module of the operating system 30 or a standalone loader entity allowing the provisioning of software (such as, for instance, use case dependent firmware) within the SE 100. Such loader entities are also referred to as Image Trusted Loader, ITL, in the art. Update agents like the one identified the reference numeral 10 in FIGS. 1 to 3 are the main entities in charge of loading software or software images into the secure element 100 as well as any other procedure related to it, such as update, restore, or rollback of an installed software. In FIG. 2 a software image intended for updating the OS 30 is referred to by reference numeral 31. The OS image 31 has been uploaded onto SE 100 and stored in a non-volatile memory of the SE 100, for example the memory 50. The update agent 10 has also been loaded onto the SE 100 during factory production (see step S1 of FIG. 4), because it reflects a security critical entity of the SE 100.

The update agent 10 may contain its own reserved memory space in form of a memory structure 11, to store sensible data thereon, for instance personalization data and/ or authentication data, the latter being used to authenticate and/or decrypt a software image, such as the OS image 31, before it is personalized.

The data used, generated, and processed by the SE 100 is, like in any other computer entity, logically organized in form of a file system 32 that is administered by the operating system 30 of that computer entity. Within the context of smart cards, such as security and tamper-resistant elements, file systems may be structured in conformity with ISO/IEC 7816-9. A smart card file system 32 therefore assumes a tree structure with the root element being a master file (MF) and leaf elements being dedicated directory files (DF) and elementary data files (EF), the latter comprising all data required by applications of the smart card or secure element 100.

The external terminal 200 shown in FIGS. 2 and 3 may represent an entity which communicates with the SE 100. It can be a LPA (Local Profile Assistant), a server, or whatever device it is that the SE 100 may be in connection with. Particularly, the external terminal 200 is or comprises an image delivery server and provides during a subsequent production phase (FIG. 1, phases II, III, IV) the OS image 31 through a customized interface. More broadly speaking, the terminal 200 of FIGS. 2 and 3 represents the network to which the SE 100 is connected, sometimes referred to as "broadband" infrastructure in the art.

The interaction and message exchange between the SE 100 and an external terminal 200 may be organized in conformity with ISO/IEC 7816-12 and consists of APDU container messages (Application Protocol Data Unit). Accordingly, the terminal 200 may send a command 14 (cmd), a so called command-APDU or C-APDU, and receive a response 15 (*rsp*) from the OS 30, a so called response-APDU or R-APDU, in reaction to the terminal's request.

The SE 100 in the state as illustrated in FIG. 2 has completed the initial chip production (FIG. 1, phase I) and has left the chip manufacturer's certified environment to proceed to a subsequent production phase (FIG. 1, phases II, II, or IV). In this situation, personalization data 13 has been uploaded onto to SE 100 (see step S2 of FIG. 4) and the OS image 31 has been uploaded into memory 50 (see step S4 of FIG. 4), the latter being installed by the update agent 10 as a new, updated operating system 30 of the SE 100.

In this situation, the OS 30 is not available during update and thus at least temporarily cannot provide its usual functionality and interoperability with respect to administering the file system 32 or processing commands 14 receives from a terminal 200. The update agent 10 therefore assumes control of the SE 100 from the OS 30. Being in charge of the SE 100 during OS update, the update agent 10 upholds the operability of the SE 100 by providing a provisional file system 12 to ensure that the terminal 200 nevertheless receives meaningful responses 15 in reaction to commands 14 and that the SE 100 is not deactivated or disconnected by the terminal 200 due to lack of such responses.

FIG. 4 shows a flow chart of the main steps of a method for updating an installed OS 30 in a secure element 100 by an OS image 31. The steps of the method are described in detail with reference to the SE 100 illustrated in FIG. 2 and the detailed view shown in FIG. 3.

The method according to the present invention, as described in the following, is not restricted to the particular situation of an operating system update. In fact, further interruptions of SE operation or intermediate non-functional states of the operating system or other critical trusted software can be handled according to the present invention to the effect that an external terminal 200 or another entity in communication with such SE 100 is not affected by the interruption or state transition, but continues to experience a proper, responsive and well-defined behavior of the SE 100.

Steps S1, S1a and S2 are performed within a certified environment during the factory production phase of the SE 100 to ensure security and authenticity of its software components and data. Steps S3 to S6 represent the OS update process that can be performed outside of the certified environment of the chip manufacturer, in a subsequent phase II, or III, or even later (see FIG. 1).

With reference to FIG. 3, in a first step S1 performed in the initial chip production phase I, the update agent 10 is provided in the SE 100, likely by uploading it onto the SE 100. The update agent 10 reflects a security critical entity of the SE 100 that is loaded onto the SE 100 within a certified environment of the chip manufacturer during factory production phase I.

In a step S1a, which may be implemented as a separate step or may be a part of providing the update agent 10 in the SE 100 in step S1, the provisional file system 12 is provided in the SE 100. The provisional file system 12 is a part of the update agent's 10 own personalization and this may be a functional consequence of provisioning an operational the update agent 10 in the course of step S1. Particularly, the provisional file system 12 is provide in the same way as the update agent 10 is provide with its credentials and cryptographic keys.

In a second step S2, personalization data 13 is uploaded onto the SE 100. The personalization data 13 is security critical as well, as it particularly includes secure credentials and cryptographic keys. During factory production phase I, trusted software, for example an initial operating system 30 of the SE 100, is uploaded and installed on the SE 100. In the course of its initial installation, an uploaded operating system is personalized using personalization data 13 and an operative operating system 30 is rendered that is referred to as "maxInit" in FIG. 1.

In order to update the installed OS 30 by means of an OS image 31 outside the chip manufacturer's certified environment in a subsequent production phase II, III, or IV, the update agent 10 assumes control over the SE 100 from the OS 30 in step S3. In step S4, the OS image 31 is uploaded into memory 50 by the update agent 10. The OS image 31 may be provided by the terminal 200 or a dedicated software image server in charge of providing images of software to be updated on an SE 100.

As of this point, instead of the OS 30, the update agent 10 is particularly in charge of the SE's communication with a terminal 200. Also, the regular file system 32 usually administered by the OS 30 of the SE 100 is not available anymore and operations related to dedicated files, DF, or elementary files, EF, of the file system 32 cannot be processed. This is because, on the one hand, the OS 30 is temporarily not in charge and, on the other hand, the regular file system 32 is not available to the update agent 10 for processing requests or commands 14 from the terminal 200 related to the file system 32.

In order to prevent the SE 100 from being deactivated by the terminal 200 due to lack of meaningful responses 15, a provisional file system 12 is provided in step S1a that may replace the regular files system 32 until the operating system 30 is updated and fully in charge again.

According to alternative embodiments, steps S3 and S4 can be performed in a different order as compared to that shown in FIG. 4. For instance, the OS image 31 may be uploaded prior to the update agent 10 taking over control from the OS 30. In any case, however, the provisional file system 12 is provided prior to the update agent 10 assuming control of the SE 100, because the former takes place during production phase I while the latter takes place in a later production phase, subsequent to phase I.

Likewise, the exact point in time during the course of steps S3 and S4 at which the regular file system 32 is not available anymore may vary. While according to the embodiment of FIG. 3 it is assumed that the file system 32 is unavailable as a consequence of the update agent 10 assuming control in step S3, according to other embodiments the file system 32 may be unavailable as of when the OS image is uploaded in step S4 or even later, when the installation of the OS image is actually commenced.

FIG. 3 shows a preferred embodiment of the provisional file system 12 that is provided by the update agent 10 in step S1a and stored in memory structure 11. FIG. 3 also illustrates the administration of the provisional file system 12 by the update agent 10 according to step S5 and the exchange of APDU messages 14, 15 between the SE 100 and the terminal 200 or, respectively, the network or broadband infrastructure the SE 100 is connected with.

Logically, the provisional file system 12 of FIG. 3 is realized as a data grouping identified by a data grouping identifier, DGI. In the Smart Card context, a data grouping is a data record whose structure is specified by its DGI. Therefore, by referring to a data grouping's DGI, an application, such as the update agent 10, can recognize the internal structure of the data grouping and access or process particular data items of the grouping, for example DF or EF files of the provisional file system 12. On the byte level, the data grouping representing the provisional file system 12 is realized in TLV format, according to which any file of the provisional file system 12 is represented by a byte sequence consisting of a leading tag byte (T), providing the type of a TLV structure, followed by two length bytes (L), providing the byte size of the data stored by the particular TLV structure, and the specified number of bytes that store the actual use data or value (V).

The provisional file system shown in FIG. 3 is provided by the update agent 10 so that it covers a minimum number of files of the unavailable file system 32 that it temporarily replaces or simulates. The data structure representing the provisional file system 12 thus starts with a master file MF, followed by an elementary file EF1 and a sequence of further dedicated and elementary files, among which is the elementary file EFn logically lying within the dedicated file DF. The files represented within this TLV structure observe the hierarchical parent/child structure of the regular file system 32 in that it also reflects if and which elementary files EF are logically situated within a dedicated file DF. The hierarchical structure of the file system may be coded in the tag T of dedicated files DF.

As an integral part of the administration of the provisional file system 12 in step S5, the update agent 10 keeps a pointer pt that indicates the file currently selected, also known as context, i.e. the specific file which is to be manipulated by the next command.

Given the provisional file system 12 of FIG. 3 in which initially the master file MF is selected, a terminal 200 would, for example, send a C-APDU 14 instructing selection of file EFn. If the update agent 10 would, after taking over control of the SE 100 in step S3, not administer the provisional files system 12, the command 14 would not be processed and properly responded to, due to unavailability of the OS 30 and the file system 32. In effect, the terminal 200 would deactivate the SE 100.

Providing the provisional file system 12 in steps S1a and administering it in step S5, however, allows for properly processing of and responding to the SELECT command 14. Firstly, the update agent 10 invokes a context change in that the pointer pt is moved from the master file MF to point to the elementary file EFn selected by the terminal 200. Secondly, the successful context change is reported by the update agent 10 to the terminal 200 by way of a R-APDU 15 that delivers an appropriate status code SW indicating that the requested context change was conducted, for example status code '9000'. That is, even though the original file EFn of the regular file system 32 is not available, the terminal 200 receives a meaningful response 15 based on file EFn of the provisional file system 12.

Further, even in a case where a request by the terminal 200 cannot be successfully processed by the update agent 100, e.g. a command 14 selecting file EFx, which would exist in the regular file system 32 but was not created as part of the provisional file system 12, the update agent 10 captures the command 14 and responds an appropriate 'error code' interpretable by the terminal 200 to prevent the SE 100 from being deactivated.

Commands 14 of the terminal 200 that are not related to a particular file of the provisional file system 12 are processed by the update agent 10 in that a standard status code is responded, while the command 14 as such is either ignored entirely or registered for later processing by the OS 30, once it takes back control of the SE 100 in step S6.

In order to balance memory consumption with versatility and extent, the update agent 10 provides a provisional file system 12 that only covers the minimum functionality and minimum data to process as much commands 14 of the external terminal 200 as possible. Apparently, the file EFx that the terminal 200 instructs to select in FIG. 3, may exist in the regular files system 32 but, apparently, has been left aside upon provisioning of the provisional file system 12 because it does not contribute to the minimum functionality that the provisional file system 12 is supposed to provide. In general, the provisional file system 12 is so designed that the terminal 200 does not notice the temporal unavailability of both the operating system 30 and the file system 32.

While the provisional file system 12 is administered in step S5 so that the unavailability of the operating system 30 is transparent to the terminal 200, the OS image 31 uploaded in step S4 into the non-volatile memory 50 is installed in step S5a by the update agent 10 to become the new, updated operating system 30. Installation of the OS 30 may involve various steps and processes, among which is personalizing the OS image 31 using personalization data 13 that has been uploaded into the memory structure 11 of the update agent 10 in step S2.

Finally, when the OS update is completed, the update agent 10 may hand over control of the SE 100 back to the updated OS 30 in step S6. As of this point, commands 14 from the terminal 200 are processed and responded to by the updated OS 30 based on the regular file system 32 that is reinstated as a consequence of handing over control in step S6.

In essence, the provisional file system 12 can be viewed as a limited simulation of the regular file system 32, or even as a 'mock version' thereof, that is required only to that extent that the interaction between the SE 100 and a terminal 200 can be upheld as long as the update agent 10 substitutes the OS 30 and is in charge of the SE without having access to the full extent of the regular file system 32.

The methods and apparatus as described through the embodiments above, provides an efficient and secure solution for personalizing a trusted software image outside of the certified environment of a chip manufacturer's site. As the software image can be personalized at a later phase and outside the chip manufacturer's environment, a flexible solution for personalizing software at any time during the lifecycle of a secure element is provided.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for updating an operating system, OS, administering a file system in a secure element, SE, the method comprising:

providing an update agent in the SE;

assuming control of the SE by the update agent from the operating system;

loading an OS image into the SE, the OS image representing an update of the operating system;

providing an updated operating system by installing the OS image; and handing over control of the SE by the update agent to the updated operating system;

wherein the update agent provides a provisional file system in the SE and administers the provisional file system as long as the update agent is in control of the SE, wherein the update agent provides the provisional file system so that it is transparent to an external terminal that the operating system and/or the file system is not available as long as the update agent is in control of the SE.

2. The method according to claim 1, wherein the update agent provides the provisional file system so that it contains the minimum functionality required to process commands of an external terminal.

3. The method according to claim 1, wherein the update agent provides the provisional file system so that the SE is not deactivated and/or disconnected by an external terminal in reaction to a command sent to the SE.

4. The method according to claim 1, wherein the update agent provides the provisional file system in a memory structure of the update agent.

5. The method according to claim 1, wherein the update agent provides the provisional file system as a data grouping with a data grouping identifier, DGI, and in a TLV format keeping parent/child file relationships of the file system.

6. The method according to claim 1, wherein the update agent keeps a pointer to a selected file of the provisional file system, for example in reaction to a file-related command received from an external terminal, and/or responds a status byte in reaction to a file-unrelated command received from an external terminal.

7. The method according to claim 1, wherein the update agent is provided by loading the update agent into the SE during a production phase of the SE, while the OS image is loaded into and installed on the SE in a subsequent phase after a production phase of the SE.

8. The method according to claim 1, wherein the provisional file system is provided as a part of the update agent, comprised in personalization data of the update agent, and/or upon loading the update agent into the SE during a production phase of the SE.

9. A secure element, SE, comprising a non-transitory computer-readable storage medium with an update agent and an operating system, OS, embedded therein, the OS administering a file system and the update agent being configured to:

assume control of the SE from the operating system;

load an OS image into the SE, the OS image representing an update of the operating system;

provide an updated operating system by installing the OS image; and hand over control of the SE by the update agent to the updated operating system;

wherein the update agent is further configured to provide a provisional file system in the SE and to administer the provisional file system as long as the update agent is in control of the SE, wherein the update agent is configured to provide the provisional file system so that it is transparent to an external terminal that the operating system and/or the file system is not available as long as the update agent is in control of the SE.

10. The secure element according to claim 9, wherein the update agent is further configured to conduct a method for updating an operating system, OS, administering a file system in a secure element, SE, when it is executed by a processor of the secure element, the method comprising:

providing an update agent in the SE;

assuming control of the SE by the update agent from the operating system;

loading an OS image into the SE, the OS image representing an update of the operating system;

providing an updated operating system by installing the OS image; and handing over control of the SE by the update agent to the updated operating system;

wherein the update agent provides a provisional file system in the SE and administers the provisional file system as long as the update agent is in control of the SE.

11. An update agent embedded in a non-transitory computer-readable storage medium for use in a secure element, SE, the update agent being configured to:

assume control of the SE from an operating system;

load an OS image into the SE, the OS image representing an update of the operating system;

provide an updated operating system by installing the OS image; and hand over control of the SE by the update agent to the updated operating system;

wherein the update agent is further configured to provide a provisional file system in the SE and to administer the provisional file system as long as the update agent is in control of the SE, wherein the update agent is configured to provide the provisional file system so that it is transparent to an external terminal that the operating system and/or the file system is not available as long as the update agent is in control of the SE.

12. The update agent according to claim 11, wherein the update agent is further configured to conduct a method for updating an operating system, OS, administering a file system in a secure element, SE, when it is executed by a processor of the secure element, the method comprising:

providing an update agent in the SE;

assuming control of the SE by the update agent from the operating system;

loading an OS image into the SE, the OS image representing an update of the operating system;

providing an updated operating system by installing the OS image; and handing over control of the SE by the update agent to the updated operating system;

wherein the update agent provides a provisional file system in the SE and administers the provisional file system as long as the update agent is in control of the SE;

and/or is realized as an executable software product configured to be installed on a security element and to be executed by a processor of the security element, the secure element comprising an operating system, OS, administering a file system and an update agent configured to:

assume control of the SE from the operating system;

load an OS image into the SE, the OS image representing an update of the operating system;

provide an updated operating system by installing the OS image; and hand over control of the SE by the update agent to the updated operating system;

wherein the update agent is further configured to provide a provisional file system in the SE and to administer the provisional file system as long as the update agent is in control of the SE.

13. The secure element according to claim 9, or an update agent for use in a secure element, the update agent being configured to:

assume control of the SE from the operating system;

load an OS image into the SE, the OS image representing an update of the operating system;

provide an updated operating system by installing the OS image; and hand over control of the SE by the update agent to the updated operating system;

wherein the update agent is further configured to provide a provisional file system in the SE and to administer the provisional file system as long as the update agent is in control of the SE;

wherein the update agent is configured:

to provide the provisional file system so that it contains the minimum functionality required to process commands of an external terminal and/or so that the SE is not deactivated and/or disconnected by an external terminal in reaction to a command sent to the SE and/or so that it is transparent to an external terminal that the operating system and/or the file system is not available as long as the update agent is in control of the SE, and to provide the provisional file system in a memory structure of the update agent, as a data grouping with a data grouping identifier, DGI, in a TLV format keeping parent/child file relationships of the file system.

14. A computer-program product for use in conjunction with a secure element, SE, in an electronic device, the computer-program product comprising a non-transitory computer-readable storage medium and a computer-program mechanism embedded therein, to load a software into the secure element in the electronic device, the computer-program mechanism including:

instructions for assuming control of the SE from an operating system;

loading an OS image into the SE, the OS image representing an update of the operating system;

providing an updated operating system by installing the OS image; and handing over control of the SE by the computer-program mechanism to the updated operating system;

wherein the computer-program mechanism further includes instructions for providing a provisional file system in the SE and for administering the provisional file system as long as the computer-program mechanism is in control of the SE so that it is transparent to an external terminal that the operating system and/or the file system is not available as long as the computer-program mechanism is in control of the SE.

* * * * *